Sept. 1, 1964  F. M. MATHEWS ETAL  3,146,654
BALE SAMPLER
Filed Nov. 14, 1961  3 Sheets-Sheet 1
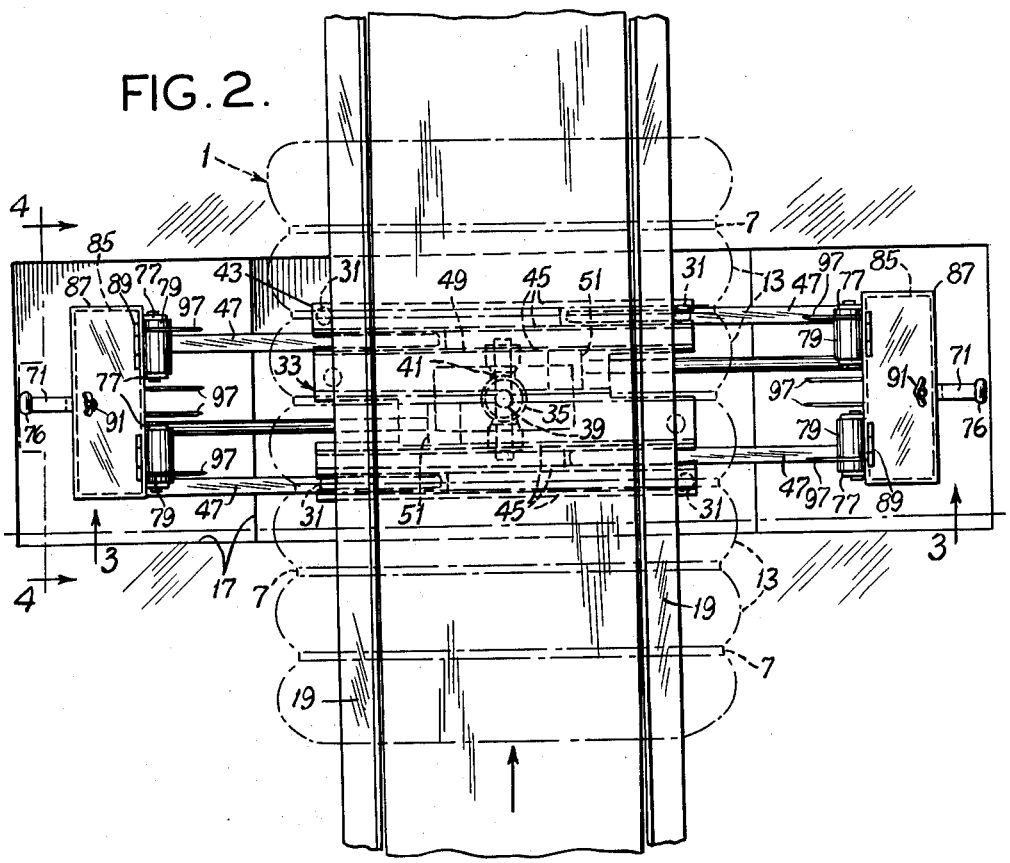
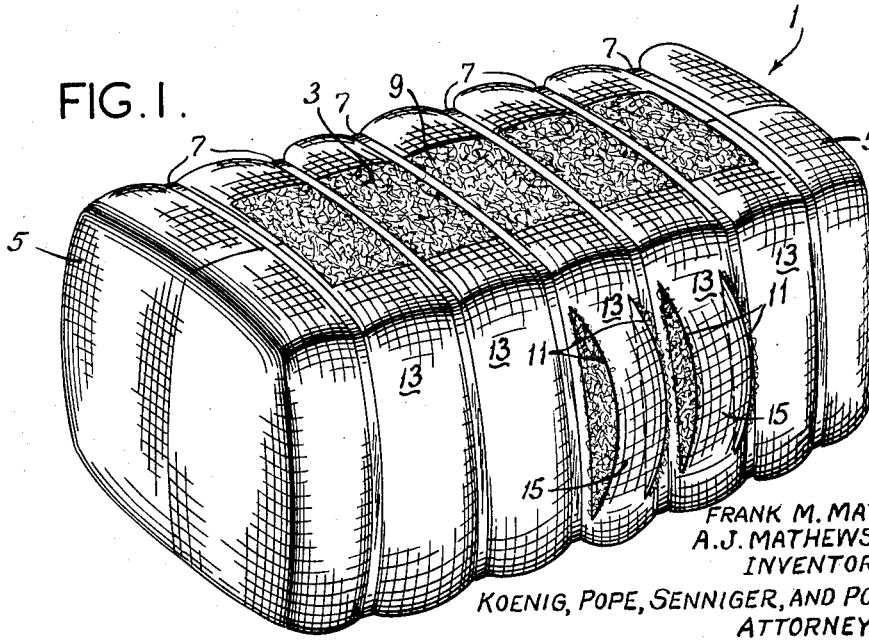
FRANK M. MATHEWS,
A.J. MATHEWS III,
INVENTORS.
KOENIG, POPE, SENNIGER, AND POWERS,
ATTORNEYS.

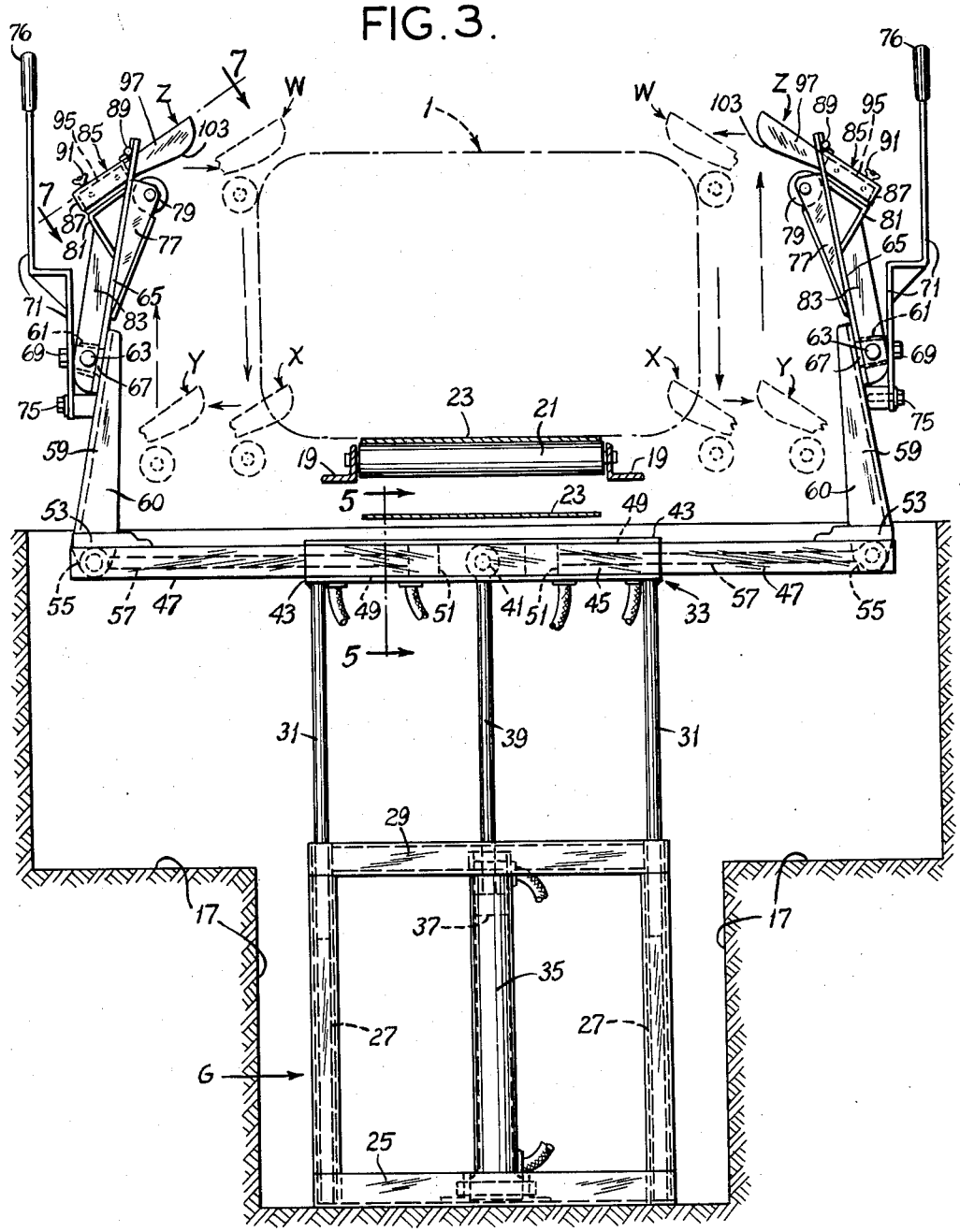

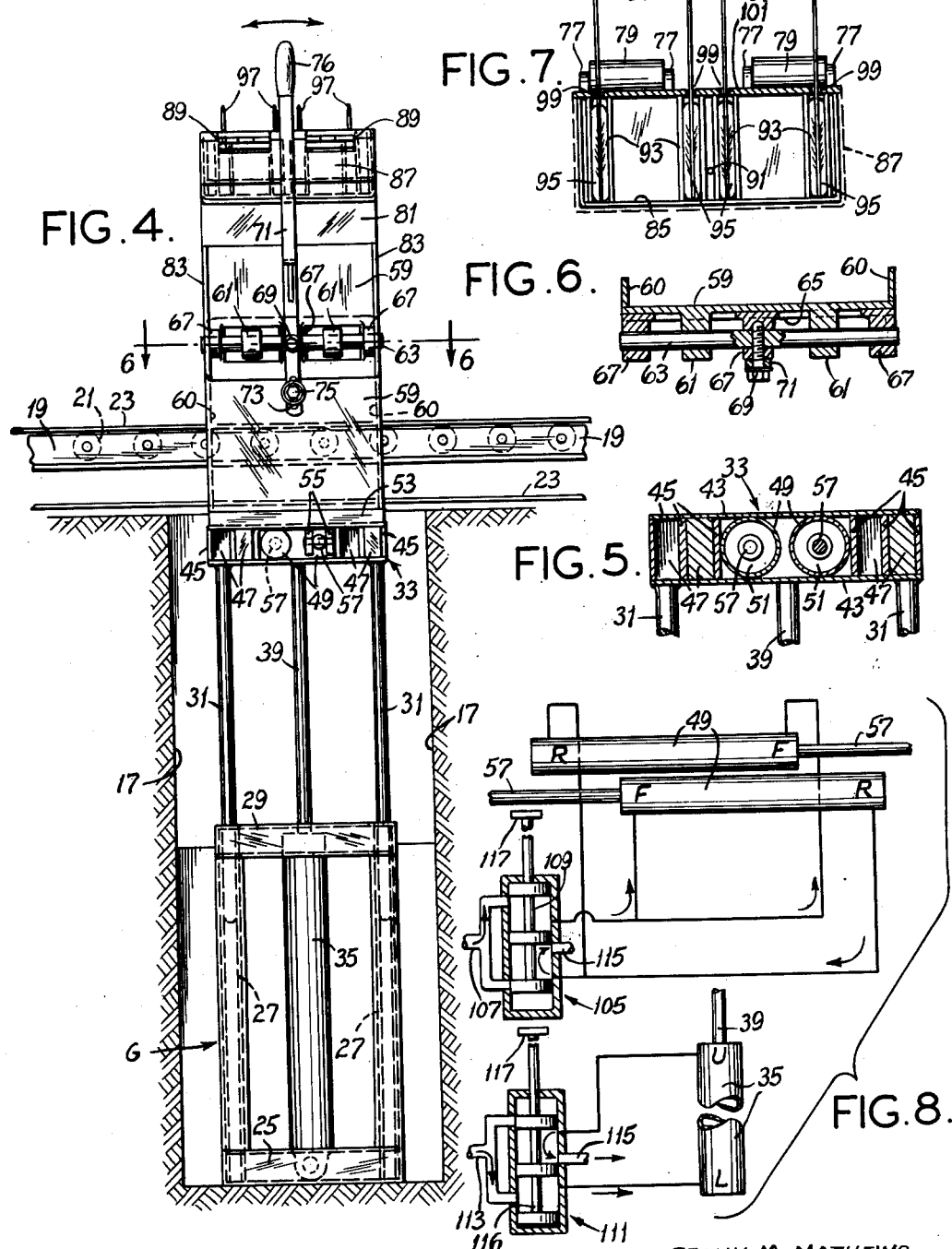

United States Patent Office 3,146,654
Patented Sept. 1, 1964

3,146,654
BALE SAMPLER
Frank M. Mathews, Malden, and A. J. Mathews III, Kennett, Mo., assignors to Mathews Bros., Inc., Kennett, Mo., a corporation of Missouri
Filed Nov. 14, 1961, Ser. No. 152,203
3 Claims. (Cl. 83—368)

This invention relates to bale samplers, and with regard to certain more specific features, to automatic gashing apparatus providing for sampling of cotton bales and the like.

Among the several objects of the invention may be noted the provision of an automatic cutting apparatus for cotton bales and the like which minimizes the danger, strength and skill heretofore connected with the manual operations employed in slashing cotton bales and the like for removal and sampling of some of their contents; the provision of a sampling means which minimizes damage to the material, such as cotton, being sampled and leaves the bales with uniform improved appearances; and the provision of apparatus of this class which conserves warehouse space and reduces the usual hard labor formerly necessary for sampling. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is a perspective view of a cotton bale, illustrating sampling gashes which have been made therein by means of the invention;

FIG. 2 is a plan view of cutting apparatus made according to the invention;

FIG. 3 is a vertical section taken on line 3—3 of FIG. 2;

FIG. 4 is a vertical section taken on line 4—4 of FIG. 2;

FIG. 5 is an enlarged cross section taken on line 5—5 of FIG. 3;

FIG. 6 is an enlarged horizontal section taken on line 6—6 of FIG. 4;

FIG. 7 is an oblique section taken on line 7—7 of FIG. 3; and

FIG. 8 is a digrammatic view of certain hydraulic circuitry employed in the apparatus shown in FIGS. 2–7.

Corresponding reference numerals indicate corresponding parts throughout the several views of the drawings.

The background for one field of use of the invention is as follows: Cotton is traded on the basis of samples taken from bales into which ginned cotton is compressed and bound. The baled cotton is quite dense and not amenable to convenient extraction of samples from its contents, even from any exposed bale surfaces not covered by the enveloping burlap or like cover. In order to make extraction possible, the bale must be gashed with a cutting object such as a knife, which has the effect of locally releasing compression so that some cotton will bulge or fluff out enough that thereafter a sufficient mass of it may be grasped by hand and pulled out to constitute a sample. If the gashing is done manually by slashing with a knife, as is usual, considerable strength and dexterity are required to obtain a proper exposure of the cotton for abstracting the sample but without excessively damaging the bale for further transport. At best, manual sampling is both difficult and dangerous because of the sharpness of the cutting knives required and the force with which they must be wielded. Rotary hand and other saws or the like have been suggested, but they also are dangerous and in some cases tend to scorch the cotton fibres. By means of the present invention, bales at low cost may be rapidly, safely and neatly gashed to provide for effective sample extraction.

Referring now more particularly to FIG. 1 of the drawings, there is shown at numeral 1 a compressed bale of ginned cotton 3. As is usual, the bale includes a burlap or like wrap or cover 5 and is surrounded by steel girth bands 7. An unwrapped face such as shown at 9 is usually, if not always, left. In view of the compressed condition of the cotton, it is not practicable to withdraw a sample even through an opening such as 9. Consequently, the bale is gashed as shown at 11, for example, at four places on each side of the bale. Four gashes on one side of the bale are shown in FIG. 1, but it will be understood that on the opposite side are four opposite gashes not shown in said FIG. 1. Each pair of gashes appears in a panel such as numbered 13, located between bands 7. As a result, between each pair of gashes in a panel 13 the cotton bulges outward and results in pushing the burlap out as an arch or bulge, as shown at 15. The cotton under each bulge is in an expanded condition and soft enough that samples may conveniently be abstracted by hand.

From the above it will be seen that there are eight gashes to be provided for four samples to be taken from opposite sides of the bale. Composite samples are made from these, which are placed in packages for government control and the use of brokers dealing in the cotton.

Referring now more particularly to FIGS. 2–8, there is shown at numeral 17 a pit at subfloor level which may be located in a warehouse. Extending across the pit 17 are angle irons 19, supporting rollers 21 which in turn support a movable conveyor belt 23, powered for motion under control of suitable means, not shown. By suitable operation of the belt 23, successive bales 1 may be brought into rest positions over the pit. Very precise locations of the bales are not necessary, for reasons to be shown. A suitable general location is shown by the dot-dash lines in FIGS. 2 and 3.

Located at the bottom of the pit is a guide structure G, consisting of a base 25 supporting four vertical cylindrical guides 27 which are joined at the top by means of a stiffening header 29. Telescoped with the guides 27 are four slide rods 31, joined at their upper ends by means of a crosshead or platform structure 33. Fixedly and vertically mounted between the base 25 and the header 29 is a hydraulic cylinder 35 in which slides a piston 37. From the piston 37 extends a piston rod 39 having a driving connection with the crosshead 33 at 41.

The crosshead 33 is shown more in detail in FIG. 5. It consists of upper and lower plates 43, joined by webs 45 so as to form guide means for oppositely extending pairs of slide members 47. The members of each pair of slide members 47 are attached at their outer ends to cross members 53, having downwardly extending lugs 55. Piston rods 57 connect the lugs 55 with pistons 51, respectively, the latter being slidable in cylinders 49 carried in the crosshead 33.

Each cross member 53 forms the base of a sloping platen 59, ribbed as at 60. Lugs 61 extend from each platen and slidably support a crossbar 63 (FIG. 6). On each platen 59 is a slidable adjusting plate 65 having three lugs 67 through which extends the crossbar 63. The crossbar 63 is fastened by a bolt 69 to the central lug 67 and is thus affixed with respect to the three of them. Thus if a bar 63 is moved transversely in the lugs 61 on a platen 59, it will carry with it the transversely slidable plate 65.

Movement of the bar 63 is accomplished by a lever 71, pivoted on the bolt 69. The lower end of the lever is slotted, as shown at 73. A bolt 75 passes through the slot and is threaded into the fixed platen 59. Thus by swinging the handle 76 at the upper end of the lever 71 in either of the two opposite directions suggested by the dart at the top of FIG. 4, the plate 65 will be movably adjusted in the opposite direction.

Referring to FIGS. 3 and 7, numerals 77 indicate flanges on the insides of the adjustment plates 65. These carry inner rollers 79. On the outsides of the plates 65 are angle members 81 supported by outside ribs 83. The members 81 support knife containers or boxes 85 having openable lids 87 pivoted at 89. The lids 87 are adapted to be locked shut by fasteners 91. Within each box are four compartments 93 for nesting handles 95 of four knives 97. The knives extend through slots 99 in the inner sides 101 of the boxes. The knives are sharpened on their bottom edges 103 and may be removed from the boxes when opened, for resharpening or replacement. These may be the same types of knives which heretofore were manually wielded for slashing.

Referring to FIG. 8, there is diagrammed at numeral 105 a conventional direction valve for directing hydraulic fluid from an inlet 107 to the ends F of cylinders 49 and exhausting of fluid from the ends R of said cylinders, as suggested by the darts in the upper portion of FIG. 8. Or, by resetting the spool 109 of valve 105, fluid may be directed to the ends R and exhausted from their ends F.

FIG. 8 also illustrates another conventional direction valve 111, whereby fluid may be directed from an inlet 113 to the lower end L of cylinder 35. At the same time, fluid is exhausted from the upper end of cylinder 35. This is suggested by the darts at the bottom of FIG. 8. By resetting the spool 116 of valve 111, the supply and exhaust functions at opposite ends of the cylinder 35 may be reversed. It will be understood that there will be arranged a common pressure source for the inlets 107 and 113, and that exhaust pipes such as shown at 115 may lead to a common return sump; also that suitable manual control means are to be provided for the spools 109 and 115, as suggested at 117.

Operation is as follows, assuming that a bale has been brought by proper movement of the belt into position over the pit, as shown by the dot-dash lines in FIGS. 2 and 3; that the platform 33 has been lifted; and that the carriers for the opposite sets of knives 103 have been separated one from the other, as shown in solid lines in FIGS. 2 and 3:

First the direction valve 105 is set into a position to deliver hydraulic fluid to the ends F of cylinders 49. This causes pistons 51 and 57 to pull the slide members 47 inward toward one another, by drawing together the platens 59 and the assemblies of parts thereon. By moving handles 76 at this time, operators adjust the transversely movable plate 65, so that the planes of the four pairs of the knives 103 are located between pairs of the bands 7, as suggested by what is shown in FIG. 1.

In due course, as illustrated by the dotted lines on the right side of FIG. 3, the rollers 79 will engage the opposite sides of the bale 1 (see dotted-line positions W of one of the knives 103). The action automatically centers the bale which is capable of some movement on the belt 23. The resistance of the bale mass limits the movements of the rollers 79 to squeezed positions against the bale, or upon contact the operator may center valve 105 and stop movement. Then the direction valve 111 is set to introduce fluid into the upper end U of cylinder 35. This draws down the crosshead 51 and the parts assembled thereon, including the knives 103, until their lower-most positions are reached, as suggested at the dotted-line positions X. During this movement the rollers 79 have rolled down the sides of the bale in advance of the knives, which safely and neatly gash the bale. The knives are brought from positions X to dotted-line position Y by setting direction valve 105 to supply pressure to the ends R of the cylinders 49. Then the direction valve 111 is set to supply fluid to the lower end L of cylinder 35, thus returning the knives to the initial positions Z. The knives may be returned from positions Y to positions Z, either before or after the slashed bale 1 is moved by belt 23 from over the pit 17.

The result of the above-described operations is shown in FIG. 1 from which it will be clear that four cotton samples may be taken from between the four pairs of gashes 11. Unlike former slashing operations, the gashing performed by the present machine leaves neat slits of uniform lengths, with minimum damage to the bales.

The assembly of parts constituting the platform structure 33 and appurtenances may be referred to in general as the power-driven carrier. The opposite assemblies of parts thereon driven by the piston rods 57 may be referred to as cutter carriers or upwardly directed slide members which are movably (slidably) mounted on the power-driven carrier. The levers 71 and parts driven thereby may be referred to as means adapted to adjust the positions of the cutters 103 transversely with respect to the end of movement of the power-driven carrier 33.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for the crosswise gashing of a pair of opposite long sides of a horizontally disposed cotton bale; comprising a stationary framework, a horizontally disposed and vertically movable crosshead forming horizontally directed guide means, means on the framework for vertically driving said crosshead toward and away from one side of a horizontal bale, slide members in said guide means extending vertically therefrom, means for oppositely relatively moving said slide members horizontally in the guide means toward and away from two opposed vertical long sides of the bale, knives having connected blades and handles, at least one angularly directed socket portion supported on each slide member for the telescopic reception and removal of handles of the knives, the angle of said socket portion with regard to the horizontal being such that when a knife handle is telescopically inserted, the blades will extend at optimum slashing angles with respect to a vertical bale side, and means on the slide members disposed under the knives thereon engageable with the sides of the bale when said slide members approach one another to position the blades for slashing action when said crosshead moves vertically.

2. Apparatus for the crosswise gashing of a pair of opposite long sides of a horizontally disposed cotton bale; comprising a stationary framework, a horizontally disposed and vertically movable crosshead forming horizontally directed first guide means, means on the framework for vertically driving said crosshead toward and away from one side of a horizontal bale, first slide members in said first guide means extending vertically therefrom, means for oppositely relatively moving said first slide members horizontally in the first guide means toward and away from opposed vertical long sides of the bale, second guide means on said first slide members directed horizontally and at a right angle to said first guide means, second slide members in said second guide means, means carried on the first slide members for adjusting the horizontal positions of said second slide members, knives having connected blades and handles, angularly directed socket portions on each of said second adjustable slide members for the quick telescopic reception and removal of handles of the knives, the angles of said socket portions with regard to the horizontal being such that when a knife handle is telescopically inserted, the blades will extend at optimum slashing angles with respect to a vertical bale side, and roller means on the second slide members disposed under the knives thereon engageable with the sides of the bale when said first slide members approach one another to position the blades for slashing action when said crosshead moves vertically.

3. Apparatus for the vertical crosswise gashing of a pair of opposite long sides of a horizontally disposed cotton bale; comprising a member forming horizontally directed guide means which are horizontally disposed for flatwise location under a horizontally disposed bale, upwardly directed slide members extending from said guide means, means for oppositely relatively moving said slide members horizontally on the guide means toward and away from two opposed vertical long sides of the bale, knives, at least one angularly directed socket portion supported on each slide member for the reception and removal of the knives, means associated with said socket portions for adjusting certain of the socket portions relatively to one another and on said slide members in a horizontal direction along the long sides of the bale, the angle of each socket portion with regard to the horizontal being such that when a knife is inserted it will extend at optimum slashing angles with respect to vertical bale sides, means on the slide members disposed under the knives thereon engageable with the sides of the bale when said slide members approach one another to locate the blades for slashing action when said blades move vertically, and means for moving the blades vertically to accomplish said slashing action.

References Cited in the file of this patent

UNITED STATES PATENTS

| | | |
|---|---|---|
| 530,780 | Kingsbury | Dec. 11, 1894 |
| 1,175,198 | Thomas | Mar. 14, 1916 |
| 1,241,256 | Hawthorne | Sept. 25, 1917 |
| 2,695,061 | Laxo | Nov. 23, 1954 |
| 2,729,885 | Wahl et al. | Jan. 10, 1956 |
| 2,866,504 | Syers | Dec. 30, 1958 |